United States Patent [19]
Lee

[11] Patent Number: 5,971,708
[45] Date of Patent: Oct. 26, 1999

[54] BRANCH COOLED TURBINE AIRFOIL

[75] Inventor: Ching-Pang Lee, Cincinnati, Ohio

[73] Assignee: General Electric Company, Cincinnati, Ohio

[21] Appl. No.: 09/001,658

[22] Filed: Dec. 31, 1997

[51] Int. Cl.[6] .............................. B65H 1/14; F01D 5/08
[52] U.S. Cl. ........................................................ 416/97 R
[58] Field of Search .............................. 416/96 R, 97 R; 415/115

[56] References Cited

U.S. PATENT DOCUMENTS

| | | | |
|---|---|---|---|
| 2,744,723 | 5/1956 | Roush | 416/96 R |
| 3,849,025 | 11/1974 | Grondahl | 416/97 R |
| 4,180,373 | 12/1979 | Moore et al. | 416/97 R |
| 4,416,585 | 11/1983 | Abdel-Messeh | 416/97 R |
| 4,474,532 | 10/1984 | Pazder | 416/97 R |
| 4,514,144 | 4/1985 | Lee | 416/96 R |
| 5,052,889 | 10/1991 | Abdel-Messeh | 416/97 R |
| 5,395,212 | 3/1995 | Anzai et al. | 416/97 R |
| 5,403,157 | 4/1995 | Moore | 416/96 R |
| 5,591,007 | 1/1997 | Lee et al. | 416/97 R |
| 5,611,662 | 3/1997 | Cunha | 415/115 |
| 5,681,144 | 10/1997 | Spring et al. | 416/97 R |
| 5,842,829 | 12/1998 | Cunha et al. | 415/115 |

FOREIGN PATENT DOCUMENTS

| | | | |
|---|---|---|---|
| 779590 | 11/1980 | Russian Federation | 416/97 R |
| 679931 | 9/1952 | United Kingdom | 416/97 R |

*Primary Examiner*—John Ryznic
*Attorney, Agent, or Firm*—Andrew C. Hess; Rodney M. Young

[57] ABSTRACT

A turbine airfoil includes a plurality of internal ribs joined to laterally opposite first and second sidewalls to define a pair of serpentine cooling circuits therein. A span rib extends longitudinally between a root and tip of the airfoil. And, slant ribs extend outwardly from opposite sides of the span rib to define respective portions of the serpentine circuits.

18 Claims, 2 Drawing Sheets

BRANCH COOLED TURBINE AIRFOIL

BACKGROUND OF THE INVENTION

The present invention relates generally to gas turbine engines, and, more specifically, to cooling of turbine rotor blades and stator vanes therein.

A gas turbine engine includes a compressor that compresses air which is channeled to a combustor wherein it is mixed with fuel and ignited for generating combustion gases. The combustion gases flow downstream through one or more stages of turbines which extract energy therefrom for powering the compressor and producing additional output power for driving a fan for powering an aircraft in flight for example.

A turbine stage includes a row of turbine rotor blades secured to the outer perimeter of a rotor disk, with a stationary turbine nozzle having a plurality of stator vanes disposed upstream therefrom. The combustion gases flow between the stator vanes and between the turbine blades for extracting energy to rotate the rotor disk.

Since the combustion gases are hot, the turbine vanes and blades are typically cooled with a portion of compressor air bled from the compressor for this purpose. Diverting any portion of the compressor air from use in the combustor necessarily decreases the overall efficiency of the engine. Accordingly, it is desired to cool the vanes and blades with as little compressor bleed air as possible.

Turbine vanes and blades include an airfoil over which the combustion gases flow. The airfoil typically includes one or more serpentine cooling passages therein through which the compressor bleed air is channeled for cooling the airfoil. The airfoil may include various turbulators therein for enhancing cooling effectiveness, and the cooling air is discharged from the passages through various film cooling holes disposed around the outer surface of the airfoil.

The airfoil outer surface is defined by a generally concave pressure side and an opposite, generally convex suction side which extend radially between a root and a tip of the airfoil and axially between leading and trailing edges thereof. The temperature profiles of the combustion gases channeled over the airfoil vary significantly over the pressure and suction sides. This in turn affects both the cooling requirements over the airfoil and cooling effectiveness. Greater cooling is desired where heat input is greatest, and backflow margin and blowing ratio must be controlled across the film cooling holes. Film cooling holes should have suitable blowing ratios to most effectively produce a protecting layer of film cooling air over the blade surface without flow separation and with suitable backflow margin.

A typical serpentine circuit includes internal ribs extending the full radial span of the airfoil from root to tip which alternately terminate adjacent thereto to define sequential channels or passes connected by 180° reverse bends or turns. The cooling air increases in temperature in each pass as it removes heat from the airfoil and thusly creates an axial thermal gradient between the leading and trailing edges of the airfoil. In turn, thermal stress is created which affects the useful life of the airfoil.

In a turbine rotor blade, centrifugal loads must be carried through the airfoil to the rotor disk, and in turn effect substantial centrifugal stress in the blade. The radial span ribs of the serpentine circuits bridge the pressure and suction sides of the airfoil and are effective for carrying centrifugal loads. However, the interruption in the span ribs at the reverse turns do not carry centrifugal loads, and are typically located at the airfoil tip where such loads are smallest, and at the airfoil root where the airfoil is strongest.

These design constraints therefore limit the ability to optimize both airfoil cooling uniformity and centrifugal load carrying strength using typical serpentine circuits.

Accordingly, it is desired to provide an improved turbine airfoil for use in blades and vanes having more uniform cooling while maintaining airfoil strength.

SUMMARY OF THE INVENTION

A turbine airfoil includes a plurality of internal ribs joined to laterally opposite first and second sidewalls to define a pair of serpentine cooling circuits therein. A span rib extends longitudinally between a root and tip of the airfoil. And, slant ribs extend outwardly from opposite sides of the span rib to define respective portions of the serpentine circuits.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DESCRIPTION OF THE PREFERRED EMBODIMENT(S)

Figure 1:
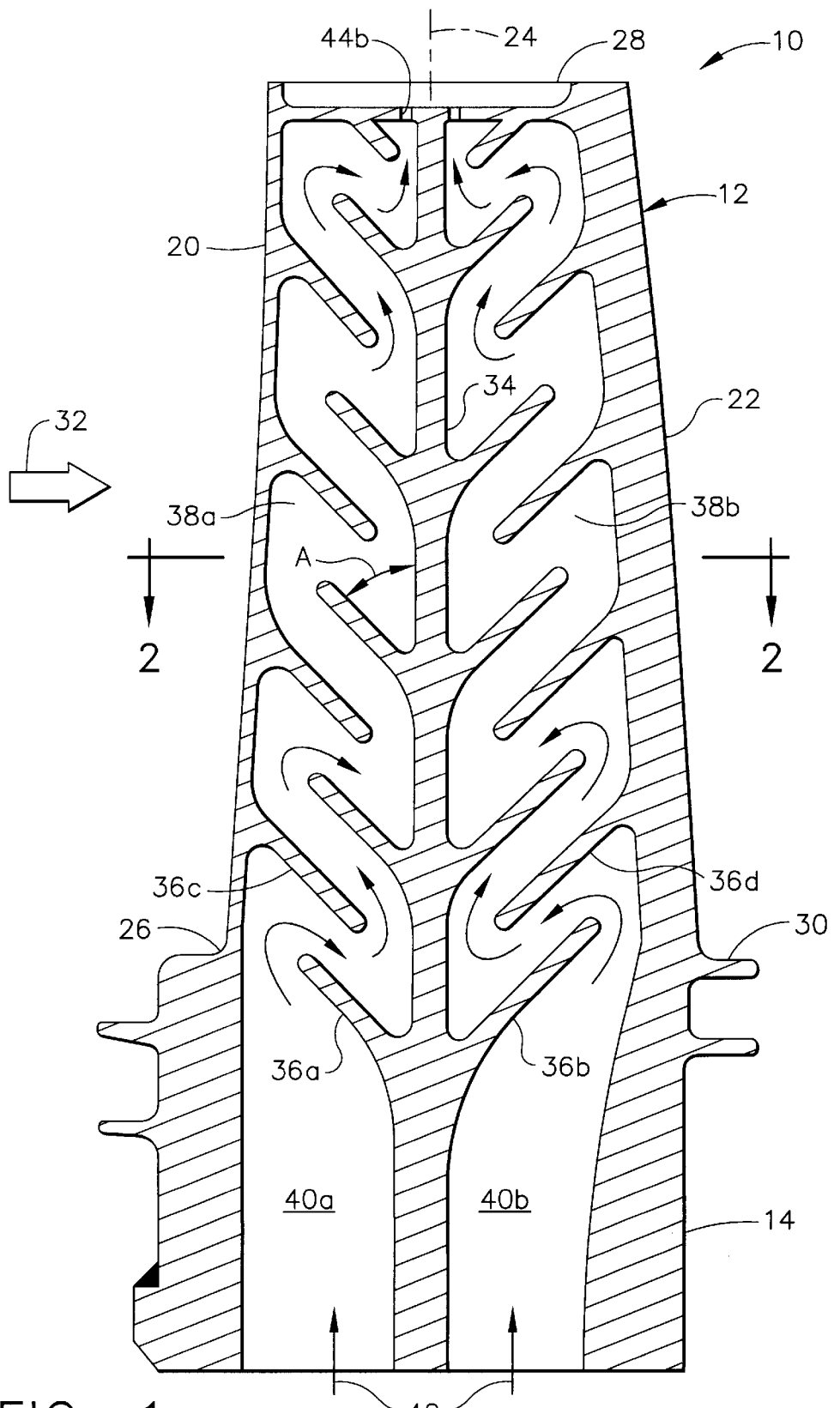
FIG. 1 is an axial sectional view of an exemplary gas turbine engine turbine blade having an airfoil including branched serpentine cooling circuits therein.
Figure 2:
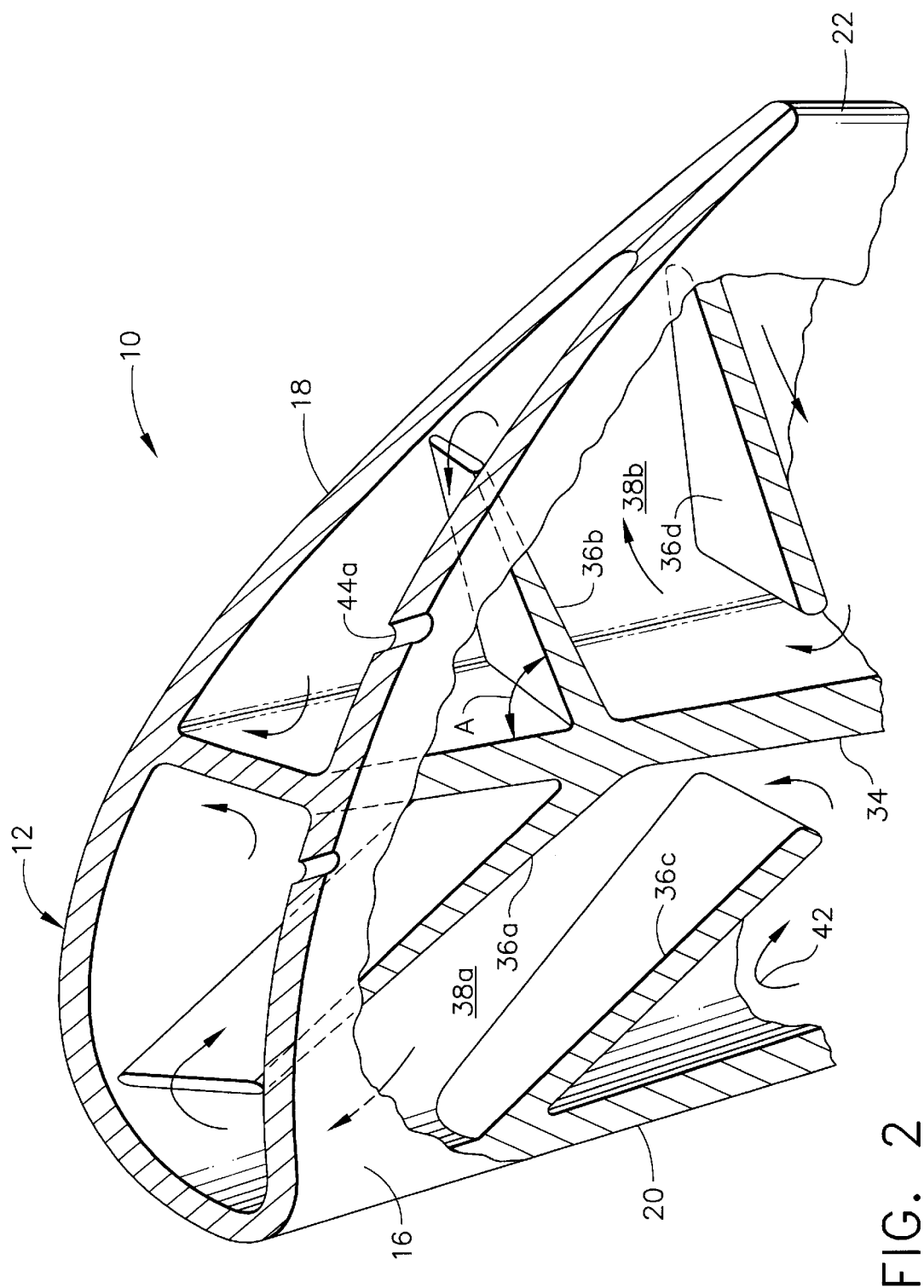
FIG. 2 is an isometric view of the outer span portion of the airfoil illustrated in FIG. 1 shown partly in section.

Illustrated in FIG. 1 is an exemplary turbine rotor blade 10 for a gas turbine engine. The blade 10 includes an airfoil 12 and a conventional dovetail 14 which is used to conventionally secure the blade 10 to a rotor disk (not shown) of the engine. An isometric of the airfoil 12 is illustrated in FIG. 2 and shows a first or pressure sidewall 16 and a second or suction sidewall 18 joined together along an upstream leading edge 20 and a downstream trailing edge 22 which is spaced axially or chordally therefrom.

As shown in FIG. 1, the airfoil 12 also extends longitudinally along a longitudinal or radial axis 24 in the direction of the span of the airfoil 12 from a radially inner root 26 to a radially outer tip 28. The root 26 is defined at a conventional platform 30 which forms the inner flow boundary of the airfoil 12 and below which extends the dovetail 14. And, centrifugal loads are carried through the airfoil root and dovetail to the rotor disk during operation.

During operation of the blade 10, combustion gases 32 are generated by a combustor (not shown) and flow downstream over both airfoil sidewalls 16 and 18. The radial or longitudinal temperature profile of the combustion gases 32 typically is center-peaked near the mid-span region of the airfoil from about 50% to about 80% span thereof. Secondary flow fields between adjacent ones of the airfoils 12 may cause the temperature profile to shift radially outwardly over the airfoil pressure sidewall 16 radially outwardly over a range of about 70% to about 85% of the radial height or span of the airfoil 12. Accordingly, the pressure sidewall 16 experiences its greatest heat input or load above the mid-span region in the 70% to 85% span height.

In accordance with the present invention, preferential cooling of the airfoil 12 is effected to reduce thermal gradients therefrom while maintaining airfoil strength to accommodate centrifugal loads for example. Although an exemplary gas turbine rotor blade 10 is illustrated in the Figures, the invention applies equally as well to turbine stator vanes having similar airfoils which may be similarly cooled in accordance with the present invention.

More specifically, the first and second sidewalls 16, 18 are spaced circumferentially or laterally apart from each other between the leading and trailing edges 20,22 and are integrally joined together by an internal center or main span rib 34 and cooperating slant ribs indicated generally by the prefix 36. The ribs preferably define a pair of independent serpentine cooling passages or circuits 38a,b arranged as branches on opposite sides of the common span rib 34. A first or forward serpentine tier circuit 38a is disposed between the span rib 34 and leading edge 20. And a second or aft serpentine tier circuit 38b is disposed between the span rib 34 and the trailing edge 22 for similarly longitudinally cooling respective portions of the airfoil 12 to reduce thermal gradients in each radial or longitudinal section thereof.

Each of the two serpentine circuits 38a,b includes an independent radially extending inlet channel 40a,b, respectively, extending radially inwardly through the dovetail 14. Cooling air 42 is conventionally channeled to the inlets 40a,b from a compressor (not shown) to cool the airfoil.

When the blade 10 is rotated atop the disk during operation, substantial centrifugal force is generated in the airfoil which increases in magnitude from the tip to the root of the airfoil, with the entire centrifugal force generated by the rotating blade being transferred by the dovetail 14 into the rotor disk. The centrifugal loads carried by the different portions of the airfoil create centrifugal stress therein which is inversely proportional to the effective load carrying cross-sectional area thereof. The centrifugal force is carried in part by the continuous first and second sidewalls 16,18, span rib 34, and cooperating slant ribs 36 therein.

As shown in FIG. 2, the radially extending span rib 34 provides an integral bridge between the first and second sidewalls 16,18 and provides additional cross-sectional area for carrying the centrifugal loads with reduced stress. The slant ribs 36 extend generally along the chords of the airfoil and outwardly from opposite sides of the center rib 34 to provide branches therefrom which increase the load carrying strength of the airfoil and define improved serpentine cooling circuits. The slant ribs 36 are preferably slanted obliquely to the span rib 34 at an oblique slant angle A which is less than or greater than 90° depending upon the tilt orientation of the slant ribs 36.

Each slant rib is preferably straight and uniform in cross-section, and has a longitudinal centerline axis disposed at the slant angle A. The slant angle A is in the preferred range of 30° to 60° to maximize the centrifugal load bridging capability of the slant ribs while obtaining enhanced serpentine cooling effectiveness therewith.

The slant ribs 36 define respective portions of the serpentine circuits 38a,b longitudinally above and below the respective slant ribs 36 and on opposite sides of the span rib 34, while also providing additional centrifugal load carrying capability in the airfoil in cooperation with the sidewalls 16,18. Orienting the slant ribs 36 normal to the span rib 34 with an angle A of 90° is not preferred since this orientation merely provides additional dead weight which must be carried solely by the adjoining material. By tilting the slant ribs 36 over an extended longitudinal range, they provide additional structural support between the sidewalls 16,18 for improving the centrifugal load carrying capability of the airfoil 12.

In the FIG. 1 embodiment, the common center rib 34 cooperates with a plurality of the slant ribs 36 spaced longitudinally apart on both sides of thereof. The slant ribs 36 extend integrally from the span rib 34. And, the slant ribs 36 extend obliquely to the several span rib 34 and are substantially parallel to each other. In this arrangement, the centrifugal load carrying capability of the airfoil 12 is interrupted longitudinally by the slant ribs 36, but by obliquely tilting the slant ribs 36 in the radial direction a portion of the interrupted load carrying capability is retained.

The slant ribs 36 may have various forms including first or branch slant ribs 36a,b extending integrally in two symmetrical groups from both opposite sides of the center rib 34. And, second slant ribs 36c,d are spaced chordally from both opposite sides of the center rib 34 in two symmetrical groups which receive longitudinally therebetween respective ones of the first slant ribs 36a,b. In the preferred embodiment, the second slant ribs 36c,d extend integrally inwardly from respective ones of the leading and trailing edges 20,22.

In this arrangement, each of the slant ribs 36 has a tip end spaced chordally from either the center rib 34 or the leading and trailing edge portions of the airfoil to define respective 180° reverse turns for the airflow 42. In the exemplary embodiment illustrated, each circuit 38a,b has eleven flow passes with ten corresponding reverse turns defining two skewed serpentine flowpaths which channel the airflow 42 in parallel from root to tip of the airfoil.

The first slant ribs 36a,b preferably slant upwardly between root and tip from the center rib 34 toward respective ones of the leading and trailing edges 20,22. Correspondingly, the second slant ribs 36c,d slant downwardly between the tip and root from the respective leading and trailing edges 20,22 toward the center rib 34.

This arrangement is preferred both for enhancing the strength of the airfoil both longitudinally and torsionally, while also enhancing cooling effectiveness. The span rib 34 is preferably disposed mid-chord between the leading and trailing edges 20,22, and extends continuously from the root 26 to the tip 28 and integral therewith. The center span rib 34 therefore provides a strong central structure which bridges the first and second sidewalls 16,18 in an I-beam configuration which preferably extends from the tip 28 inwardly to the root 26 and beyond to the bottom of the dovetail 14. The branch ribs 36a,b provide additional support between the sidewalls 16,18 and the center rib 34 to both carry and distribute centrifugal loads thereto. And, the slant ribs 36c,d stiffen the leading and trailing edge portions of the airfoil, and also carry and distribute centrifugal loads thereto.

The pair of serpentine circuits 38a,b extend from root 26 to the tip 28 independently of each other. Airflow 42 enters the blade through the dovetail and flows radially outwardly through the two parallel circuits 38a,b to the airfoil tip. Along the way the air picks up heat and increases in temperature. The coldest air is therefore provided over the airfoil root to maintain the strength thereof where the centrifugal load is greatest. And, above mid-span where the heat load is typically greatest, the separate circuits can provide cooling air more directly thereto at lower and more uniform temperature.

A more uniform temperature distribution may be obtained along each radial section since similar cooling may be achieved in each of the two parallel circuits. This includes the root of the airfoil between the leading and trailing edges, as well as the upper span sections. The more uniform temperature in each section in turn reduces thermal stress due to temperature gradients.

The two parallel circuits 38a,b have relatively short slant ribs 36 and a correspondingly high number of reverse turns with significant flow turbulence that enhances heat transfer and cooling therefrom. The slant ribs 36 terminate in the preferred embodiment directly inside the leading and trailing edges 20,22 and therefore directly provide impingement cooling thereof not possible in conventional serpentine circuits. A conventional airfoil typically utilizes separate cooling circuits at the leading and trailing edges in addition to serpentine cooling in the mid-chord region. These separate circuits may be eliminated in some designs using the present invention, although in alternate designs they may be used with the present invention if desired.

Accordingly, the slant ribs 36 cooperate with the airfoil sidewalls 16,18 and the center span rib 34 to improve the centrifugal load carrying capability of the airfoil 12 when configured in the improved branched serpentine circuit arrangement. The slant ribs 36 also increase the torsional stiffness of the airfoil 12 for restraining torsional vibration thereof. And, the branched cooling circuits provide enhanced cooling effectiveness and chordal uniformity.

The enhanced cooling effectiveness of the branched airfoil 12 is now available with improved strength of the airfoil 12 itself due to the slanted ribs 36. The cooling air 42 may be discharged from each of the serpentine circuits 38a,b through conventional film cooling holes 44a extending through either or both sidewalls 16,18, or may be discharged through conventional tip cooling holes 44b, or may be discharged through conventional trailing edge cooling holes (not shown).

The serpentine circuits 38a,b may also be used in any suitable combination which conventional cooling features for turbine blades, including various forms of internal pins or other turbulators which extend in part into the serpentine circuits from inside the sidewalls 16,18. Due to the increased cooling effectiveness of the branched serpentine circuits 38a,b, these additional cooling enhancing features may be reduced or eliminated depending upon the specific design application.

Although the invention has been described with respect to the exemplary turbine blade 10 illustrated in the Figures, it may also be used for turbine nozzle vanes which have similar airfoils which can benefit therefrom. The branched circuit airfoil 12 may be readily manufactured using conventional casting techniques as are used for conventional multi-pass serpentine passages.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

I claim:

1. A turbine airfoil comprising:
   first and second sidewalls joined together at chordally spaced apart leading and trailing edges and extending longitudinally from a root to a tip;
   said sidewalls being spaced apart from each other between said leading and trailing edges and joined together by a plurality of internal ribs defining a pair of serpentine cooling circuits; and
   said ribs include a span rib extending longitudinally between said root and tip, and slant ribs extending outwardly from opposite sides of said span rib to define respective portions of said serpentine circuits.

2. An airfoil according to claim 1 further comprising a plurality of said slant ribs spaced longitudinally apart on both sides of said span rib, and extending substantially parallel to each other along each of said sides.

3. An airfoil according to claim 2 wherein:
   first ones of said slant ribs extend from both sides of said span rib; and
   second ones of said slant ribs are spaced from both sides of said span rib and receive longitudinally therebetween respective ones of said first slant ribs to define portions of said serpentine circuits.

4. An airfoil according to claim 3 wherein said first and second slant ribs extend obliquely to said span rib.

5. An airfoil according to claim 4 wherein:
   said first slant ribs slant upwardly from said span rib toward said leading and trailing edges; and
   said second slant ribs slant downwardly from said leading and trailing edges toward said span rib.

6. An airfoil according to claim 5 wherein:
   said first slant ribs extend integrally from said span rib; and
   said second slant ribs extend integrally from respective ones of said leading and trailing edges.

7. An airfoil according to claim 6 wherein:
   said span rib is disposed mid-chord between said leading and trailing edges, and extends continuously from said root to tip; and
   said pair of serpentine circuits extend from said root to tip, independently of each other.

8. A turbine airfoil comprising:
   first and second sidewalls joined together at chordally spaced apart leading and trailing edges and extending longitudinally from a root to a tip;
   said sidewalls being spaced apart from each other between said leading and trailing edges and joined together by a plurality of internal ribs defining a pair of serpentine cooling circuits; and
   said ribs include a span rib extending continuously from said root to said tip, and slant ribs extending outwardly from opposite sides of said span rib to define respective portions of said serpentine circuits.

9. An airfoil according to claim 8 further comprising a dovetail integrally joined to said airfoil root, and said span rib extends continuously in said dovetail.

10. An airfoil according to claim 9 further comprising a plurality of said slant ribs spaced longitudinally apart on both sides of said span rib, and extending substantially parallel to each other along each of said sides.

11. An airfoil according to claim 10 wherein:
    first ones of said slant ribs extend from both sides of said span rib; and
    second ones of said slant ribs are spaced from both sides of said span rib and receive longitudinally therebetween respective ones of said first slant ribs to define portions of said serpentine circuits.

12. An airfoil according to claim 11 wherein said first and second slant ribs extend obliquely to said span rib.

13. A turbine airfoil comprising:
    first and second sidewalls joined together at chordally spaced apart leading and trailing edges and extending longitudinally from a root to a tip;

said sidewalls being spaced apart from each other between said leading and trailing edges and joined together by a plurality of internal ribs defining a pair of serpentine cooling circuits; and said ribs include a span rib extending longitudinally between said root and tip, and slant ribs extend outwardly and obliquely from opposite sides of said span rib to define respective portions of said serpentine circuits.

14. An airfoil according to claim 13 wherein:

first ones of said slant ribs extend from both sides of said span rib; and second ones of said slant ribs are spaced from both sides of said span rib and receive longitudinally therebetween respective ones of said first slant ribs to define portions of said serpentine circuits.

15. An airfoil according to claim 14 wherein:

said first slant ribs slant upwardly from said span rib toward said leading and trailing edges; and said second slant ribs slant downwardly from said leading and trailing edges toward said span rib.

16. An airfoil according to claim 15 wherein:

said first slant ribs extend integrally from said span rib; and said second slant ribs extend integrally from respective ones of said leading and trailing edges.

17. An airfoil according to claim 16 wherein:

said span rib is disposed mid-chord between said leading and trailing edges, and extends continuously from said root to tip; and said pair of serpentine circuits extend from said root to tip, independently of each other.

18. An airfoil according to claim 17 further comprising a dovetail integrally joined to said airfoil root, and said span rib extends continuously in said dovetail.

* * * * *